Nov. 13, 1951 E. C. MERRY 2,575,064
DIFFERENTIAL WHEEL UNIT FOR TRAILERS OR THE LIKE
Filed Oct. 14, 1949 3 Sheets-Sheet 2
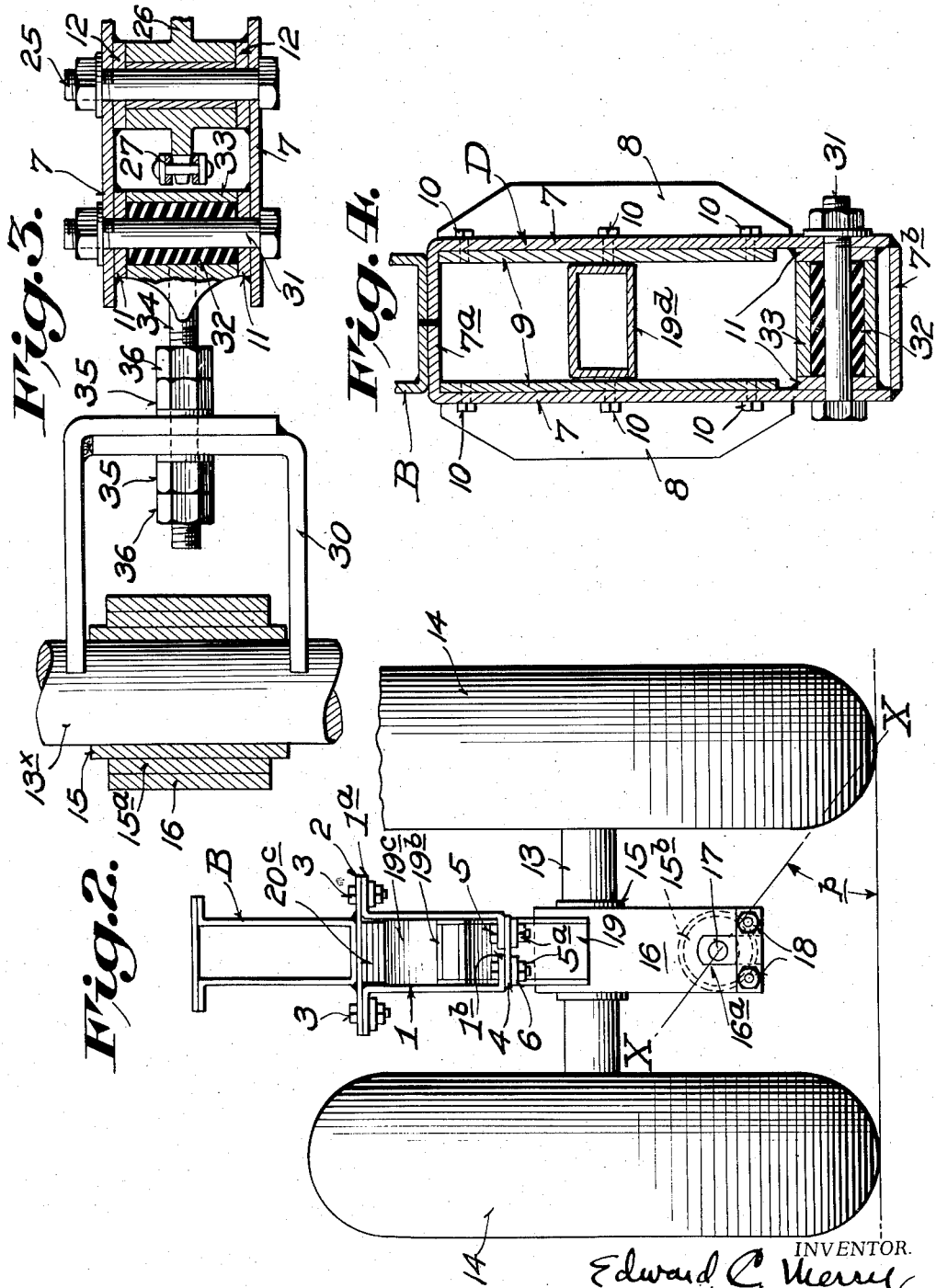
INVENTOR.
Edward C. Merry
BY
ATTORNEYS

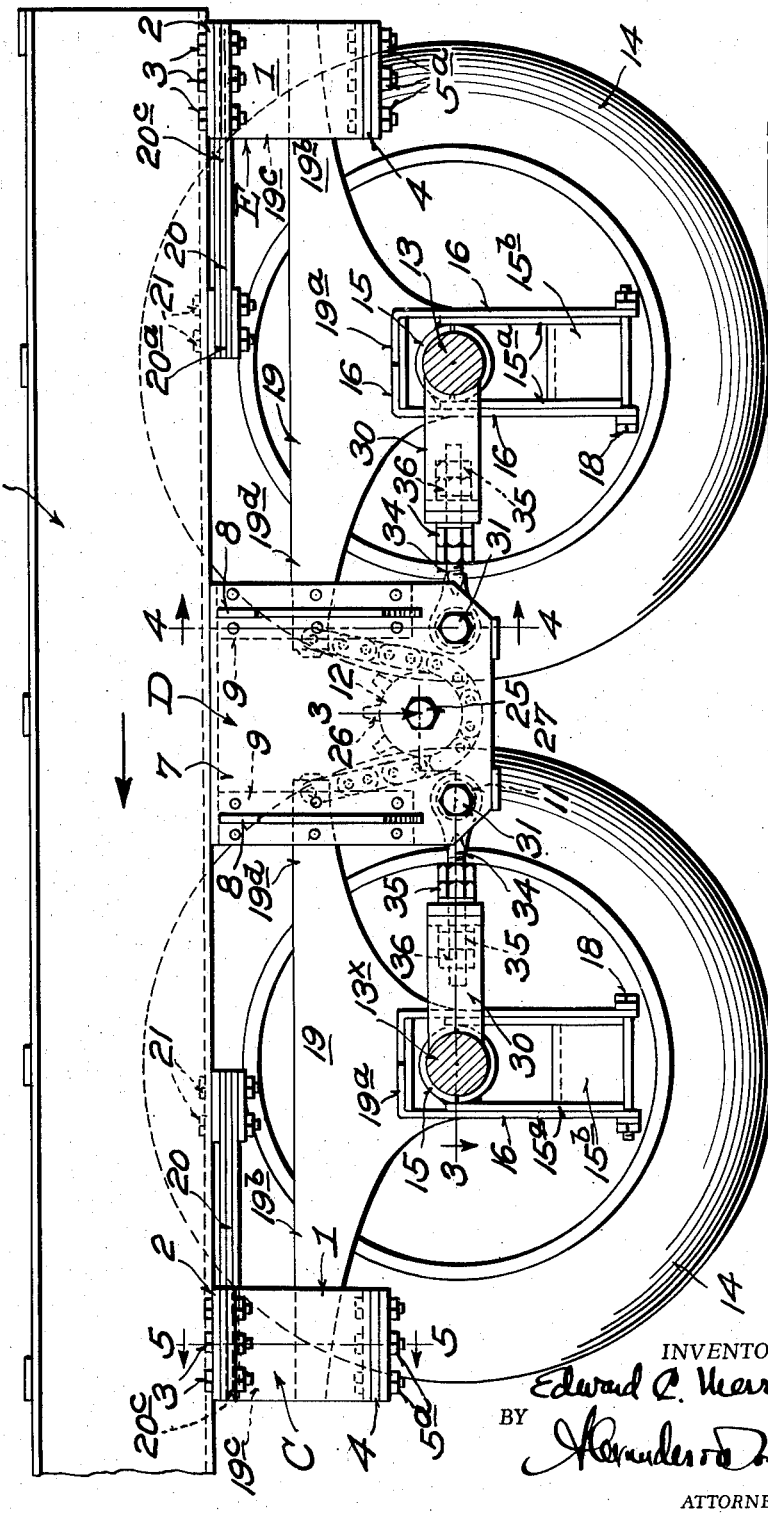

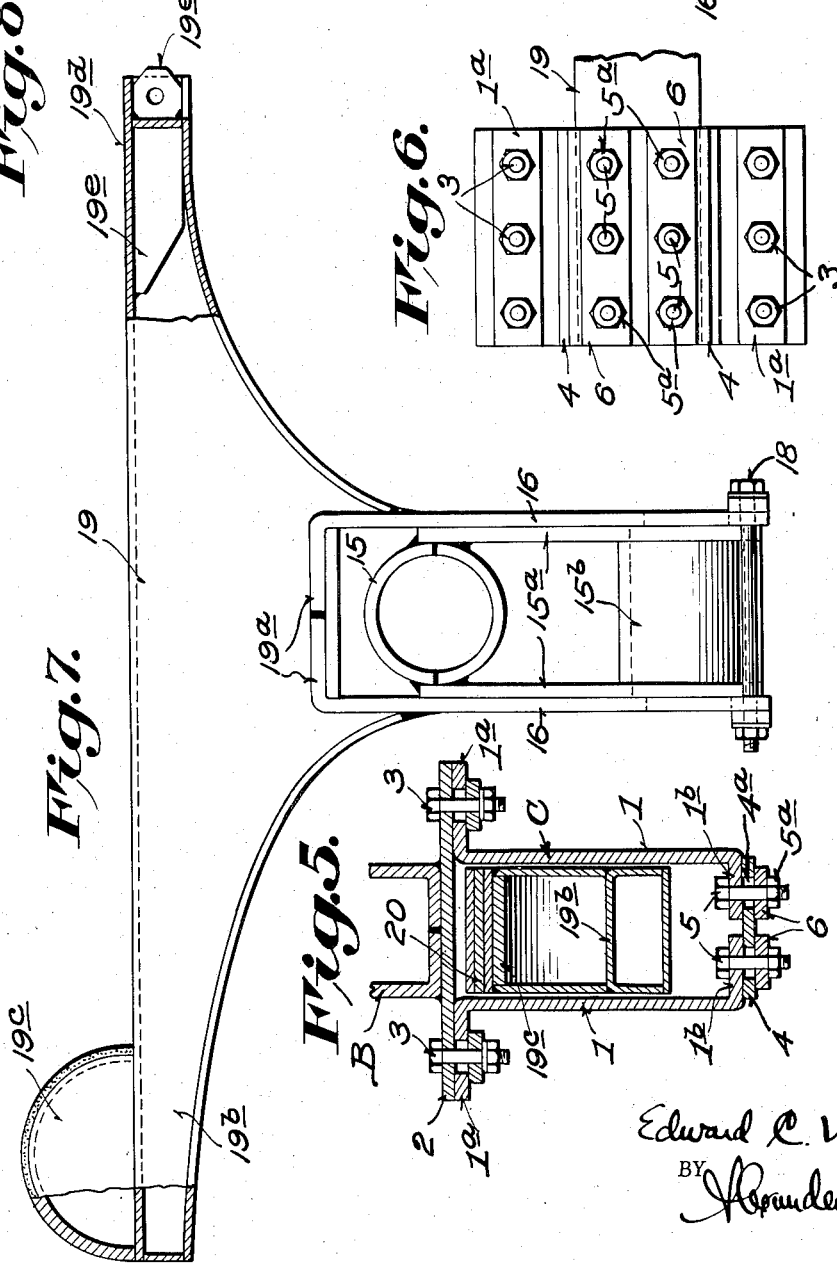

Patented Nov. 13, 1951

2,575,064

UNITED STATES PATENT OFFICE 2,575,064

DIFFERENTIAL WHEEL UNIT FOR TRAILERS OR THE LIKE

Edward C. Merry, Greensboro, N. C., assignor of one-half to Guy M. Turner, Greensboro, N. C.

Application October 14, 1949, Serial No. 121,344

16 Claims. (Cl. 280—104.5)

1

This invention is a novel differential wheel unit for trailers or the like particularly adapted to be mounted on trailing vehicles to support the rear ends thereof, whereby the vehicle may be operated at normal high speeds with safety, each unit comprising a short axle carrying a relatively large single pneumatic or other wheel at each end, the axle being adapted to pivot transversely of the vehicle on an axis disposed below the axle, and the multiple units being connected together so as to cause one axle carrying member to rise or fall longitudinally of the trailer as the adjacent axle carrying member falls or rises, or vice versa.

The present invention is an improvement on the differential wheel unit shown in my copending application Serial No. 61,345, filed November 22, 1948, in which the forward end of the leading longitudinal axle carrying member was positively prevented from shifting laterally with respect to the leading bracket frame while the rear end of said member was permitted a yieldable lateral shifting movement; such movement also being permitted in the case of the forward end of the trailing longitudinal axle carrying member. The rear end of the trailing longitudinal member was permitted an unrestrained lateral movement with respect to the rear bracket frame; and both members permitted a longitudinal shifting movement with respect to the said bracket frames.

In my present invention, both longitudinal axle carrying members are permitted to a longitudinal shifting movement, but neither member is permitted a lateral shifting movement.

Heretofore, somewhat similar units have been used to support the rear ends of such trailers but same have usually been designed primarily to maintain the platform height of the trailer as low as possible from the ground to facilitate loading and unloading of heavy machinery, or other loads. The structures disclosed in the prior art would not be practical for fast freight carrying vehicles due to their use of dual or triple wheels at each end of the short axles, with tires having undue sectional width. My arrangement, however, is specially adapted for commercial highspeed vehicles for highway use, my unit utilizing standard sized single wheels mounted on conventional short axles instead of the usual dual or triple wheels, or special trucks, heretofore used.

Contrary to the purpose of prior art structures, in carrying the loads below the axles for the express purpose of maintaining the platform height as low as possible, in my design the load

2 is suspended below the axle primarily to keep the axle itself from tipping when severe side thrusts at high speeds are encountered. In using short axles with wheels of large diameter having a center-to-center distance of approximately twenty-eight inches, there would normally be a great tendency for the axles to tip laterally when the load carrying point is disposed on the axle, or adjacent to same. In order to assure that this type of unit assembly will perform satisfactorily without tipping, the load must be carried at a point sufficiently below the axle to overcome the tipping tendency due to severe lateral tire overloads. Research has developed the fact that if the angularity of this pivot point is located at approximately 45° or less angle from the point of wheel contact with the road, the operation of the unit is quite satisfactory and the axis is still properly positioned with respect to road clearance.

The use of large diameter tires in combination with short axles, and the location of the carrying point within the above described angular range are therefore the important features of my present invention; and the prior art structures do not specify that either such requirement is critical with respect to the use of short axles in high speed highway service. Research has shown a critical relationship between the angularity of the point of road contact of the tire and the load carrying point, which angularity can range satisfactorily within the above mentioned range.

I will explain the invention with references to the accompanying drawings, which illustrate one practical embodiment thereof, to enable others familiar with the art to adopt and use the same; and will summarize in the claims, the novel features of construction, and novel combinations of parts, for which protection is desired.

In said drawings:

Figure 1 is a side elevation, showing my novel differential wheel unit mounted to support one side of the rear end of a trailer.

Fig. 2 is a rear end view of the differential unit shown in Fig. 1.

Fig. 3 is an enlarged horizontal section on the line 3—3, Fig. 1.

Fig. 4 is an enlarged vertical section on the line 4—4, Fig. 1.

Fig. 5 is an enlarged vertical section on the line 5—5, Fig. 1.

Fig. 6 is a bottom plan view of the member shown in Fig. 5.

Fig. 7 is an enlarged elevation, partly in section showing the leading longitudinal axle carrying member shown in Fig. 1.

Fig. 8 is an end view of the member shown in Fig. 7.

As shown, the trailer body is provided with side frames B at each side thereof in the usual manner, same being usually of structural steel shape and same forming no part of my present invention.

My tandem wheel units are disposed at both sides of the frame, and since the construction at both sides is identical, it is only necessary to describe the unit at one side.

At each side of frame B adjacent the rear end thereof is an open depending frame C, consisting of opposed parallel side plates 1 (Figs. 1 and 5) which are preferably outwardly flanged as at 1a at their upper ends and fixedly secured to the underside of a plate 2 welded or otherwise secured to the bottom of side frame B of the trailer body by bolts 3 or the like. The side plates 1 are inwardly flanged as at 1b at their lower ends, and a plate 4 bridges the flanges 1b, said plate having transversely elongated slots 4a therein for the reception of bolts 5 which pass through holes in the flanges 1b and through the slots 4a, same being provided with washers 6 and units 5a (Fig. 5) to maintain the parallel spacing of the plates 1.

Between the bracket C and the rear end of the side frame B of the truck is a second U-shaped bracket frame D (Figs. 1 and 4) including a base 7a and parallel side plates 7, base 7a being secured by welding or the like to the under side of the side frame B in alignment with the bracket frame C. The side plates 7 are secured together at their lower ends by a plate 7b welded to the lower ends thereof.

Vertically disposed adjacent the side edges of bracket D are reinforcement plates or ribs 8 which are preferably welded to the outer faces of side plates 7 to strengthen the side edges thereof; and on the inner faces of side plates 7 adjacent the side edges thereof are removable wear plates 9 secured thereto by screws 10 or the like for the purpose hereinafter described. At the lower corners of the bracket D are reinforcement plates 11 and at the center of the bracket D above the plates 11 are reinforcement plates 12 (Fig. 1) for the purpose hereinafter described, said plates 11 and 12 forming an integral portion of the bracket D.

At the rear end of the side frame B is a third bracket E (Fig. 1) disposed in alignment with the brackets C and D, said bracket E being disposed the same distance from center bracket D as the bracket C and being of identical construction, like parts being similarly numbered.

Between the bracket frames D—E is an axle 13, at each side of the rear end of the trailer, which axle is non-rotatable but carries at each end thereof ground wheels 14—14 disposed at each side of their respective side frames B. Directly beneath each respective side frame B is an axle bracket comprising a collar 15 (Fig. 7) welded on axle 13 and having parallel depending legs 15a carrying at their lower ends a cylindrical bushing 15b adapted to snugly receive a torsilastic bushing hereinafter described, the ends of the bushing 15b being welded to the lower ends of the legs 15a. Straddling the legs 15a is an inverted U-shaped strap 16 having slots 16a at its lower end opposite bushing 15b receiving a shacklebolt 17, said shacklebolt 17 extending through the slots 16a in the legs 16 and through the torsilastic bushing 15b. The lower ends of the legs of strap 16 are connected together by bolts 18 to maintain the legs 16 in spaced relation. The upper end of the inverted U-shaped strap 16 is welded in a rectangular recess 19a in a longitudinal member 19 (Fig. 7) the respective ends of which enter between the plates 7 of the center bracket D and side plates 1 of the bracket E, as clearly shown in Fig. 1, whereby the member 19 is maintained in longitudinal alignment with the overlying side frame members B of the trailer, the sides of member 19 directly engaging the wear plates 9 of the bracket D and the side plate 1 of bracket E to prevent lateral shifting of the member 19 therein, while permitting the ends of member 19 to rise and fall in brackets D and E. The rear end 19b of member 19 (Fig. 1) carries on its upper face a semi-cylindrical block 19c whose ends likewise contact the inner faces of the side plates 1 of bracket E. A leaf spring 20 has its forward end 20a secured by bolts 21 to the underside of side frame B, and its rear end 20c entered between the side plates 1 of bracket E, same yieldingly contacting the top of the block 19c to constantly urge same downwardly in bracket E. The forward end 19d of longitudinal member 19 is provided with spaced perforated ears 19e for the purpose hereinafter described.

Between the brackets C—D is an axle 13x, similar in all respects to axle 13 and carrying wheels 14 at opposite sides thereof, and a second strap 15—15a—15b is welded or otherwise secured to a second non-rotatable axle 13x same carrying at its lower end a shacklebolt 17. Straddling the second strap 15—15a—15b is a second U-shaped strap 16 similar in all respects to the first strap 16, the base of which is welded or otherw'se secured in a correspondingly shaped recess in a second longitudinal member 19, similar in all respects to the first longitudinal member 19, said second member 16 having opposed holes in its lower end receiving the second shacklebolt 17, whereby said axle 13x may tilt laterally with respect to the second longitudinal member 19. The forward end of the second longitudinal member 17, as shown in Figs. 1 and 7, carries a semi-cylindrical block 19c the ends of which contact the inner faces of the side plates 1 of the bracket C, so as to prevent lateral shifting of the forward end of the second longitudinal member 19 while the rear end 19d of the second longitudinal member 19 engages the wear plates 9 of the center bracket D to likewise prevent lateral shifting of the member in bracket D while, however, the ends of the second longitudinal member may rise and fall in brackets C—D. The rear end of the second longitudinal member 19 within bracket D is provided with spaced perforated ears 19e for the purpose hereinafter described. A second spring 20 also bears down upon the block 19c of the second longitudinal member 19.

By the above construction, both longitudinal members 19 and their brackets, springs, and wheeled axles are identically the same, but are reversed, same having their ends 19d adjacent and engaged in center bracket D, and their other ends 19b engaged in brackets C and E, respectively.

In the bracket D adjacent the lower end thereof is journaled a shaft 25 (Fig. 1) on which is mounted a sprocket wheel 26; and a chain 27 has its ends connected with the adjacent ends of both longitudinal members 19 utilizing the ears 19e, said chain 27 running under sprocket 26, so that, as the rear end of one longitudinal member rises or falls, the forward end of the other longitudinal member 19 will correspondingly fall or rise, as the case may be.

In order to yieldably maintain the axles 13 and 13x in the normal position shown in Fig. 1, while permitting a slight movement thereof axially of the truck body, I provide a radius rod assembly for each axle consisting of a U-shaped bracket 30 (Figs. 1 and 3) having arcuate recesses in the outer ends of its legs receiving the side of the axle to which the bracket 30 is welded. Between the side plates 7 and the reinforcing plates 11 of center bracket D is a bolt 31 on which is a rubber bushing 32 surrounded by a cast steel ring 33 connected with one end of a rod 34 the outer end of which passes through a hole in the base of bracket 30, said rod 34 being threaded and carrying nuts 35 at each side of the base of the bracket 30, also lock nuts 36, said nuts permitting adjustment of the length of the radius rod assembly. Rubber bushing 32 also permits the radius rod to shift slightly in the longitudinal direction of the rod. As shown in Fig. 1, one rod assembly 30—36 would normally be under compression and the other under tension while the truck is moving, but by reversing one assembly both rods could be arranged to operate under tension or compression, the changed rod being secured to a bracket C or E instead of the center bracket D.

The above construction provides a trailer wheel unit at each side of the rear end thereof which will be practical for fast freight carrying vehicles involving the use of single wheels on short axles equipped with ordinary tires thereon of ordinary size for fast highway operation.

In my design, the load of the trailer is carried at points below the axles, in order to keep the axles 13 and 13x from tipping when severe speed thrusts are introduced. Ordinarily, in using short axles with large diameter wheels there is a strong tipping tendency but for fast freight the load must be carried at a point sufficiently below the axle to overcome the tipping tendency under severe tire overloads. I have found that in order to maintain the axle stability, the load carrying point must be enough below the axle so that the angularity of a line X (Fig. 2) drawn from the center of the tire of a related wheel 14 at the point of road contact to the axle pivoting point 17 must be 45° or less, and my entire arrangement is designed accordingly. Thus, when the trailer is being drawn at high speeds there is little or no tendency on the part of the axles 13 and 13x to tip, and therefore maximum axle stability is maintained.

I do not limit my invention to the exact form shown in the drawings for obviously changes may be made therein within the scope of the claims.

I claim:

1. In a trailer having a body; forward end, intermediate, and rear end spaced aligned open-ended bracket frames depending below the body; horizontal aligned members having their ends entered into and slidably contacting the walls of adjacent pairs of bracket frames for preventing transverse movement of the members therein while permitting vertical movement therein; relatively short axles carried by said members and mounted to pivot transversely thereof, the pivot points being intermediate the ends of and disposed below said axles; wheels journaled on the respective ends of said axles; means in the intermediate bracket frame connecting the adjacent ends of the said members whereby as the end of one member rises the end of the other member will correspondingly fall, and vice versa; rods mounted for yieldable longitudinal movement on the bracket frames and secured to the respective axles; and means yieldably urging the outer ends of the horizontal members downwardly in their respective brackets.

2. In a trailer as set forth in claim 1, said brackets including spaced parallel side plates engaging the sides of the horizontal members; and said yieldable means comprising springs having one of their ends secured to the body and their other ends entering the end brackets and contacting the ends of said horizontal members therein.

3. In a trailer as set forth in claim 1, said members having inverted U-shaped portions straddling the axles; other inverted U-shaped members journaled on the axles and embraced by the first named U-shaped members; and bushings transfixing the lower overlapping ends of the U-shaped members and forming the said pivot points of the axles.

4. In a trailer as set forth in claim 3, the angularity of the pivot points with respect to the central points of contact of a related wheel with the road surface being no greater than 45°, in order to minimize tipping tendency of the axles at high trailer speeds when the body is subjected to substantial lateral thrusts.

5. In a trailer as set forth in claim 1, brackets secured to the axles to which one of the ends of the rods are adjustably connected, said rods having bearing rings at their other ends disposed within a bracket frame; and bushings passing through said rings and having their ends mounted in the said bracket.

6. In a trailer having a body provided with side beams; forward end, intermediate, and rear end spaced aligned open-ended bracket frames depending below the side beams; horizontal aligned members having their ends entered into and slidably contacting the walls of adjacent pairs of bracket frames for preventing transverse movement of the members therein while permitting vertical movement therein; relatively short axles carried by said members and mounted to pivot transversely thereof, the pivot points being intermediate the ends of and disposed below said axles; single wheels journaled on the respective ends of said axles; means in the intermediate bracket frame connecting the adjacent ends of the said members whereby as the end of one member rises the end of the other member will correspondingly fall, and vice versa; rods mounted for yieldable longitudinal movement on the bracket frames and secured to the respective axles; and means yieldably urging the outer ends of the horizontal members downwardly in their respective brackets.

7. In a trailer as set forth in claim 6, said brackets including spaced parallel side plates engaging the sides of the horizontal members; semi-cylindrical projections on the tops of the outer ends of the horizontal members within the end brackets; and said yieldable means comprising leaf springs having one of their ends secured to the side beams and their other ends entering the end brackets and contacting the said projections.

8. In a trailer as set forth in claim 6, said members having inverted U-shaped portions straddling the axles; other inverted U-shaped members journaled on the axles and embraced by the first named U-shaped members; and rubber torque bushings transfixing the lower overlapping ends of the U-shaped members and forming the said pivot points of the axles.

9. In a trailer as set forth in claim 8, the angularity of the pivot points with respect to the central points of contact of a related wheel with the road surface being no greater than 45° in order to minimize tipping tendency of the axles at high trailer speeds when the body is subjected to substantial lateral thrusts.

10. In a trailer as set forth in claim 6, U-shaped brackets secured to the axles to which one of the ends of the rods are adjustably connected, said rods having bearing rings at their other ends disposed within a bracket frame; and rubber torque bushings passing through said rings and having their ends mounted in the said bracket.

11. In a trailer having a body provided with side beams; forward end, intermediate, and rear end spaced aligned open-ended bracket frames depending below the side beams; horizontal aligned members having their ends entered into and slidably contacting the walls of adjacent pairs of bracket frames for preventing transverse movement of the members therein while permitting vertical movement therein; relatively short axles carried by said members and mounted to pivot transversely thereof, the pivot points being intermediate the ends of and disposed below said axles; single wheels journaled on the respective ends of said axles; means in the intermediate bracket frame connecting the adjacent ends of the said members whereby as the end of one member rises the end of the other member will correspondingly fall, and vice versa; rods mounted for yieldable longitudinal movement on the intermediate bracket frame and secured to the respective axles; and means yieldably urging the outer ends of the horizontal members downwardly in their respective brackets.

12. In a trailer as set forth in claim 11, said brackets including spaced parallel side plates engaging the sides of the horizontal members; semi-cylindrical projections on the tops of the outer ends of the horizontal members within the end brackets; and said yieldable means comprising leaf springs having one of their ends secured to the side beams and their other ends entering the end brackets and contacting the said projections.

13. In a trailer as set forth in claim 11, said members having inverted U-shaped portions straddling the axles; other inverted U-shaped members journaled on the axles and embraced by the first named U-shaped members; and rubber torque bushings transfixing the lower overlapping ends of the U-shaped members and forming the said pivot points of the axles.

14. In a trailer as set forth in claim 13, the angularity of the pivot points with respect to the central points of contact of a related wheel with the road surface being no greater than 45° in order to minimize tipping tendency of the axles at high trailer speeds when the body is subjected to substantial lateral thrusts.

15. In a trailer as set forth in claim 11, said connecting means comprising a sprocket wheel journaled in the intermediate bracket frame; and a chain running under the sprocket and having its ends respectively connected with the adjacent ends of said members.

16. In a trailer as set forth in claim 11, U-shaped brackets secured to the axles to which one of the ends of the rods are adjustably connected, said rods having rings at their other ends disposed within the intermediate bracket frame; and rubber torque bushings passing through said rings and having their ends mounted in the said bracket.

EDWARD C. MERRY.

REFERENCES CITED

The following references are of record in the file of this patent:

UNITED STATES PATENTS

| Number | Name | Date |
| --- | --- | --- |
| 1,928,860 | Marcum | Oct. 3, 1933 |
| 2,417,690 | Keller, Jr. | Mar. 18, 1947 |
| 2,446,205 | Wickersham et al. | Aug. 3, 1948 |